US000002028H

(19) United States

(12) Statutory Invention Registration

Koscica et al.

(10) Reg. No.: US H2028 H

(43) Published: Jun. 4, 2002

(54) FREQUENCY-SCAN TRAVELING WAVE ANTENNA

(75) Inventors: Thomas Koscica, Clark, NJ (US); Duc Huynh, Upper Darby, PA (US)

(73) Assignee: United States of America, Washington, DC (US)

(21) Appl. No.: 09/363,701

(22) Filed: Jul. 22, 1999

(51) Int. Cl.[7] ..... H01Q 11/02

(52) U.S. Cl. ..... 343/731

(58) Field of Search ..... 343/700 MS, 731, 343/738, 853, 864

(56) References Cited

U.S. PATENT DOCUMENTS

| | | | | | |
|---|---|---|---|---|---|
| 3,754,197 | A | * | 8/1973 | Cristal | 333/33 |
| 4,605,931 | A | * | 8/1986 | Mead et al. | 343/700 MS |
| 5,694,134 | A | * | 12/1997 | Barnes | 343/700 MS |
| 5,712,644 | A | * | 1/1998 | Kolak | 343/700 MS |

* cited by examiner

*Primary Examiner*—Daniel T. Pihulic

(74) *Attorney, Agent, or Firm*—Paul S. Clohan, Jr.; Mark D. Kelly

(57) ABSTRACT

A frequency-scan traveling wave antenna receives radio frequency (RF) energy at an input port, passes the energy through a quarter wave transformer to a first radiator element in an array of radiator elements, each pair of radiator elements being connected by a respective delay line. Each radiator element includes an input port of known characteristic impedance connected to an impedance matching section which compensates for that element's radiated power. Each radiator element has an output port with a section of transmission line disposed between a main radiator section of said radiator element and said output port, and impedance matched to the output port. In one embodiment, each delay line includes a plurality of delay line sections, with adjacent delay line sections being mutually perpendicular. In a second embodiment, each delay line includes a plurality of delay line sections disposed in meandering form.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FREQUENCY-SCAN TRAVELING WAVE ANTENNA

BACKGROUND OF THE INVENTION

1. Field of the Invention

The present invention generally relates to a frequency-scan traveling wave antenna, and more particularly to a frequency-scan traveling wave antenna which operates at frequencies in the millimeter wave range.

2. Description of the Prior Art

Frequency-scan traveling wave antennas are known in the art. Typically, uses of such antennas include their use in collision avoidance radar and in imaging radar. However, such frequency-scan traveling wave antennas are burdened by disadvantages, and those disadvantages adversely affect the quality of their performance. This interferes with the use of such antennas as an effective component of collision avoidance radar systems and imaging radar systems.

Problems with traveling wave antennas of the prior art include the following: inferior radiating element design, inadequate impedance match, insufficient power weighting accuracy, and inferior phase coherence across an array.

Accordingly, there is a need for the development of a frequency-scan traveling wave antenna which enables frequency scanning of an antenna beam at millimeter wave frequencies, where the beam and the side lobe levels are at an improved degree of controllability and performance over those of the antennas of the prior art. Moreover, there is a need for the development of a frequency-scan traveling wave antenna having an optimized radiating element design, improved impedance match, improved power weighting accuracy, and better phase coherence across the array, thereby enabling accurate design of beam width and side lobe level.

SUMMARY OF THE INVENTION

The present invention generally relates to a frequency-scan traveling wave antenna, and more particularly, to a frequency-scan traveling wave antenna which operates at millimeter wave frequencies. In particular, the present invention provides a high performance traveling wave antenna which scans by frequency, and which can be used effectively as a component of collision avoidance radar systems and imaging radar systems.

The frequency-scan traveling wave antenna of the present invention uses an impedance matching transformer at the input of each radiator element to compensate for radiated power in the element, and allows the input impedance of the radiator element to be the same as its output impedance. This is in contrast to conventional traveling wave radiators, which do not use impedance matching to correct for impedance shifts arising from radiated energy. The specific use of impedance matching at each element in the traveling wave frequency scan antenna of the present invention reduces reflections, and provides better control over array design.

The present invention also provides an arrangement of radiators and delay lines which are geometrically symmetric, thereby balancing stray radiation and minimizing the amount of degradation of the beam pattern and the side lobe levels due to radiation from the delay lines between the radiator elements.

To summarize, the traveling wave antenna of the present invention uses impedance matched radiator elements and a symmetric layout. This enables the invention to achieve an accurate degree of control over power weighting at each radiator element, resulting in improved side lobe levels and a narrow beam at millimeter wave frequencies.

Therefore, it is a primary object of the present invention to provide a frequency-scan traveling wave antenna operating at millimeter wave frequencies.

It is an additional object of the present invention to provide a high performance antenna which scans by frequency, and which can be used effectively in collision avoidance radar systems and imaging radar systems.

It is an additional object of the present invention to provide a frequency-scan traveling wave antenna having an optimized radiating element design.

It is an additional object of the present invention to provide a frequency-scan traveling wave antenna having improved impedance match.

It is an additional object of the present invention to provide a frequency-scan traveling wave antenna having improved power weighting accuracy.

It is an additional object of the present invention to provide a frequency-scan traveling wave antenna providing better phase coherence across the array, thereby enabling accurate design of beam width and side lobe level.

It is an additional object of the present invention to provide a frequency-scan traveling wave antenna which employs an arrangement of radiators and delay lines which is geometrically symmetric, thereby balancing stray radiation and minimizing the amount of degradation of the beam pattern and the side lobe levels due to radiation from the delay lines between the radiators.

The above and other objects, and the nature of the invention, will be more clearly understood by reference to the following detailed description, the associated drawings, and the appended claims.

DETAILED DESCRIPTION OF THE INVENTION

The invention will now be described in more detail with reference to the various figures of the drawings.

Figure 1:
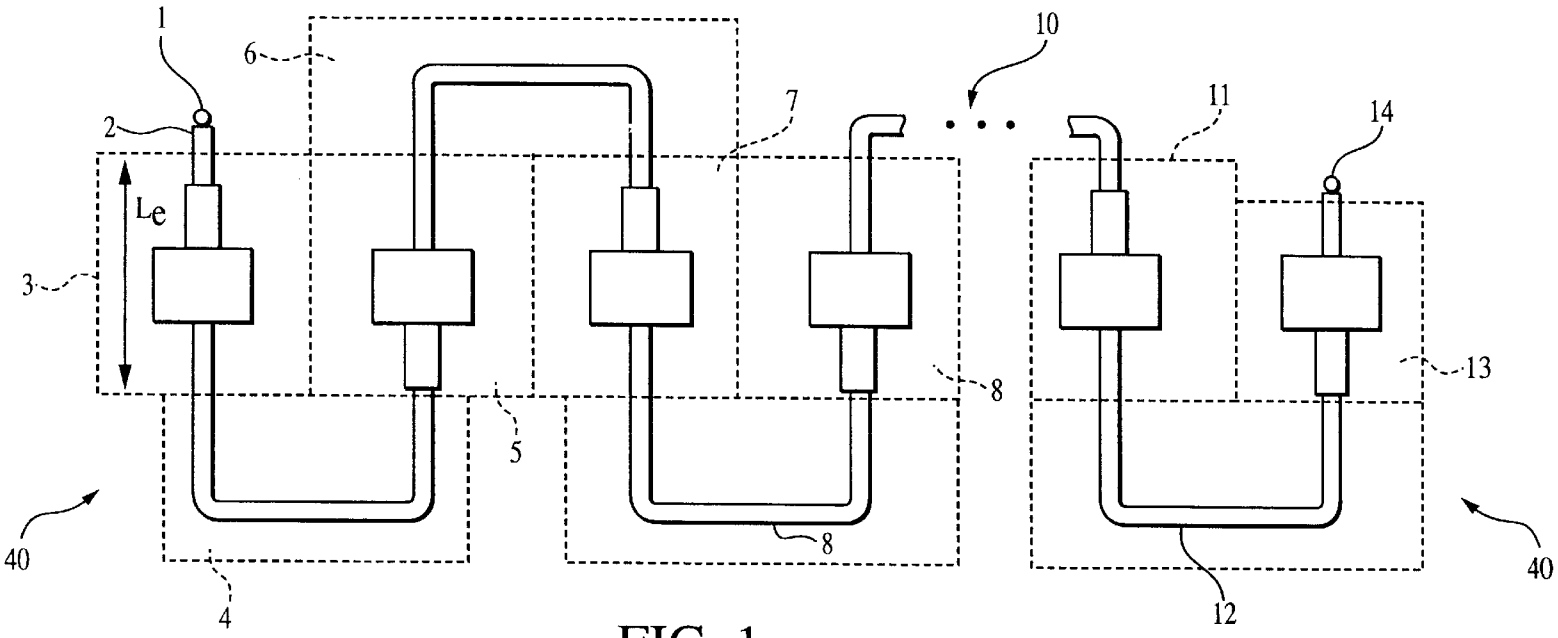
FIG. 1 is a diagrammatic representation of a preferred traveling wave antenna array employed in the present invention.

FIG. 1 is a diagrammatic representation of a preferred traveling wave antenna array employed in the present invention. As seen therein, the frequency-scan traveling wave antenna 40 of the present invention comprises the following elements: input port 1; quarter wave transformer 2; first radiator element 3; first delay line 4; second radiator element 5; second delay line 6; third radiator element 7; third delay line 8; fourth radiator element 9; intervening delay lines and radiator elements generally indicated by reference numeral 10; penultimate radiator element 11; final delay line 12; final radiator element 13; and output port 14.

The composition of each radiator element 3, 5, 7, 9, 11 and 13 (and any intervening radiator elements) will be described in detail below with reference to FIG. 2A, while the composition of each delay line 4, 6, 8, and 12 (and any intervening delay lines) will be described in detail below with reference to FIG. 2B. Output port 14 comprises an impedance matched load which may be either a matched resistor or an impedance matched port.

As with all passive antennas, the traveling wave antenna shown in FIG. 1 is reciprocal; it can be used as either a transmission or a reception device. For simplicity, the following detailed description relates to its operation as a transmitter. It will be recognized by those of ordinary skill in the art that, if the antenna described herein is used as a reception antenna, each element listed and described serves the same purpose in the reception mode as in the transmit mode, but only the direction of signal flow is reversed.

Referring to FIG. 1, in operation, radio frequency (RF) energy enters the traveling wave antenna 40 at input port 1 from an external impedance (of, for example, 50 ohms.) The RF energy is provided, via quarter wave transformer 2, to the first radiator element 3 having an electrical length Le. Radiator element 3 is connected to delay line 4 having electrical length Ld. The series of radiator elements 5,7,9,11 and 13 and delay lines 4,6,8, 10 and 12 (with intervening radiators and delay lines generally indicated by reference numeral 10 in FIG. 1) is reached by the RF energy. Final radiator 13 is connected to an impedance matched load or output port 14, which may be either a matched resistor or an impedance-matched port.

Figure 2B:
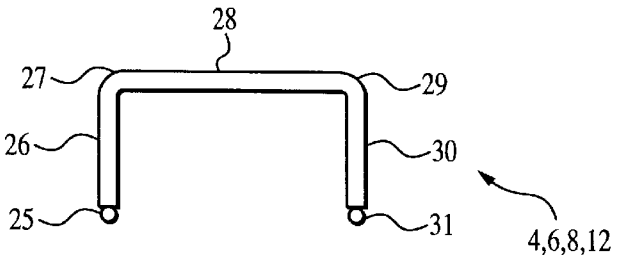
FIG. 2B is a detailed diagram of the delay line between radiator elements in the frequency-scan traveling wave antenna of the present invention.
Figure 2A:
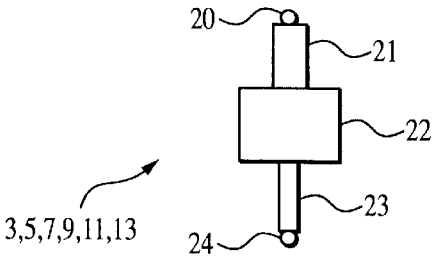
FIG. 2A is a detailed diagram of a single series feed radiating element utilized to construct the preferred traveling wave antenna array of FIG. 1.

FIG. 2A is a detailed diagram of a single series feed radiating element utilized to implement the radiating elements 3, 5, 7, 9, 11 and 13 (and intervening radiating elements) of FIG. 1. As seen therein, a single series feed radiating element comprises: an input port 20 of known characteristic impedance; an impedance matching section 21; a main radiator section 22; a transmission line section 23; and an output port 24.

Further referring to FIG. 2A, the transmission line section 23 is impedance matched to output port 24, and is included to set the electrical length of the overall radiator element to one full wavelength Le. The impedance matching section 21 adjusts the input impedance of the overall radiator so that it is the same as the impedance of the output port 24.

FIG. 2B is a detailed diagram of the delay line used to implement delay lines 4, 6, 8 and 12 (and intervening delay lines) in the frequency-scan traveling wave antenna of FIG. 1. As seen therein, the delay line consists of a section of transmission line having an input port 25 and an output port 31 connected by a conventional transmission line of uniform impedance composed of transmission line sections 26, 28 and 30. A mitered corner 27 is provided between sections 26 and 28, and a mitered corner 29 is provided between sections 28 and 30. Mitered corners 27 and 29 are of conventional optimal shape so as to maintain uniform impedance along the delay line. Input port 25 and output port 31 are separated by a spacing D, which consequently sets the spacing between radiator elements in the frequency scan array. All delay lines in the array are of the same electrical length Ld between their input port 25 and their output port 31 so as to maintain a consistent phase on each radiator element throughout the array. The preferred electrical length is one of the series (3/2, 5/2, 7/2, . . . ) wavelengths at the center frequency of operation. The radiating beam points in a perpendicular direction relative to the plane of the array at the center frequency of operation.

Figure 3:
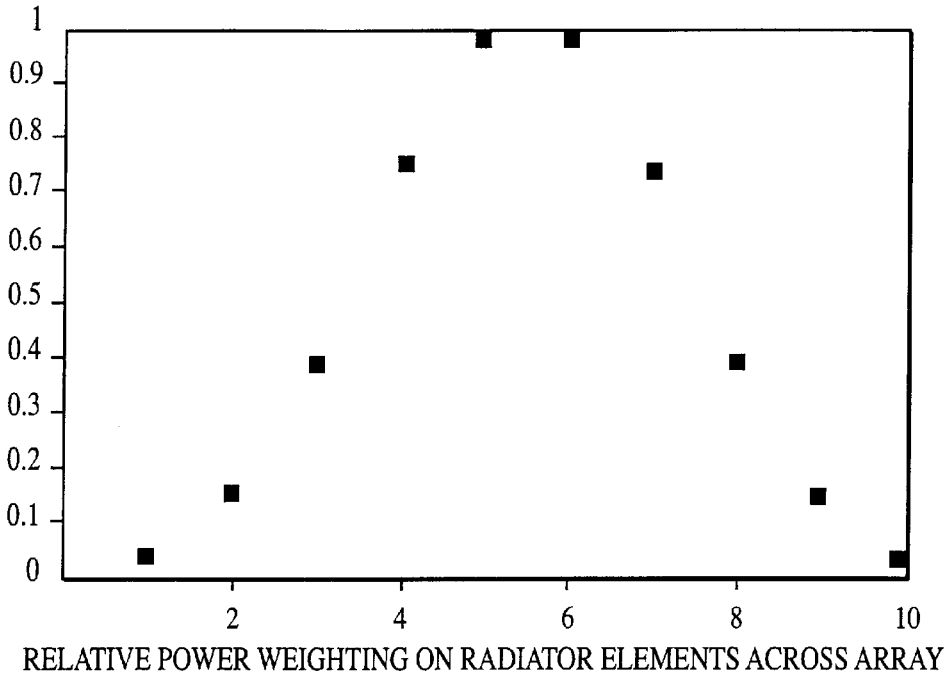
FIG. 3 is a graphical illustration of the relative power weights across the radiator elements of the array.

FIG. 3 is a graphical illustration of the relative power weights across the radiator elements of the array. In particular, FIG. 3 shows the relative power weights across the radiator elements: as determined using conventional means of calculation, known as N-Taylor taper weighting, thereby designing the beam width of the antenna. The present invention provides means for accurately yielding the sought power weights in the physical design of the traveling wave antenna.

Figure 4:
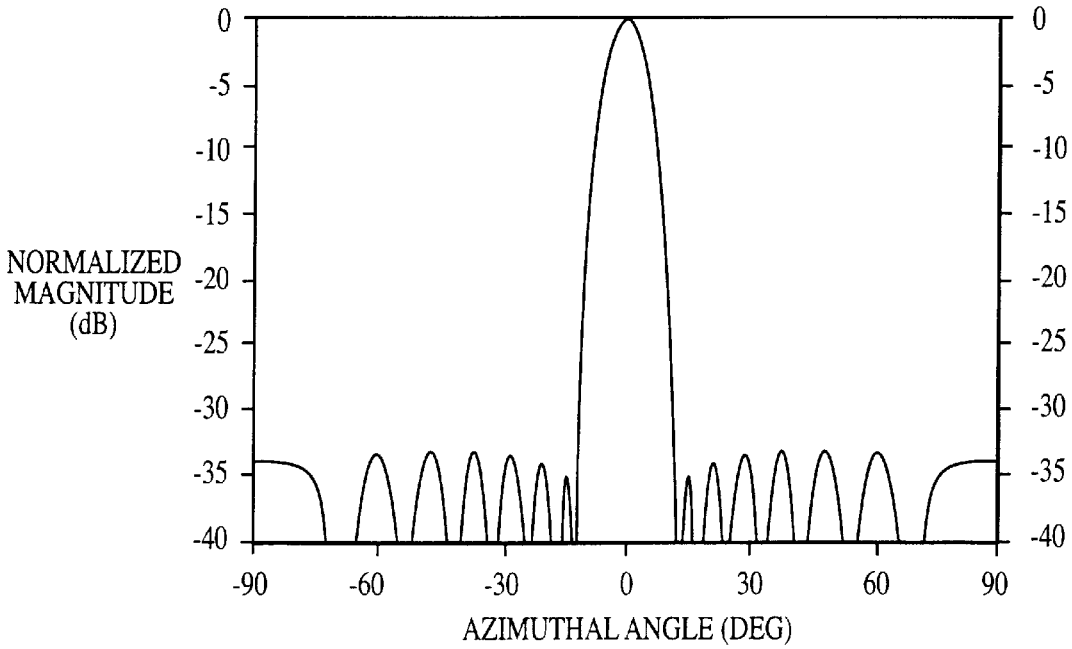
FIG. 4 is a graphical illustration of the calculated far-field pattern of an antenna (normalized magnitude in dB) verses azimuth angle (in degrees).

FIG. 4 is a graphical illustration of the calculated far-field pattern of an antenna (normalized magnitude in dB) verses azimuth angle (in degrees). That is, FIG. 4 is a graphical illustration of the calculated antenna pattern at the center design frequency when the antenna is oriented in the horizontal direction.

A further description of the operation of the invention, referring to the preceding figures, is now provided. Referring to FIG. 1, RF energy enters input port 1, and propagates through each radiator element 3, 5, 7, 9, 11 and 13 (and intervening radiator elements) of the array. A portion of the RF energy entering a particular radiator element exits from the exposed surface of that radiator element as RF radiation. Any residual energy not radiated in the radiator elements 3, 5, 7, 9, 11 and 13 (and intervening radiator elements) reaches the end of the array, and is dissipated in the output port 14 so as not to reflect backward along the array. The phase of the radiation from each radiator element 3, 5, 7, 9, 11 and 13 (and intervening radiator elements) depends on the phase of the current passing through each element. Since the flow of current reverses from top to bottom and then from bottom to top between neighboring radiator elements in the array, the electrical phase between elements at a center design frequency must be equal to (N+1/2) wavelengths for N=1,2,3, etc., so as to maintain all radiator elements in phase at the design frequency. When all radiator elements are in phase, the beam formed by the array will point perpendicular to its face. The polarization of the resulting beam is perpendicular to the length of the one-dimensional array.

When the operation frequency is slightly above the center design frequency of the array, the electrical phase between neighboring radiator elements will be slightly greater than (N+1/2) wavelengths. The extra phase will cause further elements along the array to have a leading phase in their radiation. The net result is a beam which no longer radiates perpendicularly off the face of the antenna, but which points off the antenna toward the input end of the array. The angular degree of pointing away from the perpendicular direction increases in direct proportion to the difference between the frequency and the center design frequency; that is, the further the frequency is above the center design frequency, the greater the angular degree by which the beam points away from the perpendicular direction.

When the operation frequency is slightly below the center design frequency of the array, the electrical phase between neighboring radiator elements will be slightly less than (N+1/2) wavelengths. The reduced phase will cause further elements along the array to have a lagging phase in their radiation. The net result is a beam which no longer radiates in the perpendicular direction off the face of the antenna, but rather points off the antenna away from the input end of the array. The angular degree of pointing away from the perpendicular increases in direct proportion to the amount by which the frequency is below the center design frequency; that is, the further the frequency is below the center design frequency, the greater the angular degree by which the beam points away from the perpendicular.

When the value of N is a large integer, the amount of angular scanning with frequency is increased. By having the delay line elements 4, 6, 8 and 12 (and intervening delay lines) symmetrically placed about the radiator elements 3, 5, 7, 9, 11 and 13 (and intervening radiator elements), stray RF energy radiating from the delay line sections balance each other, thereby having a reduced effect on the radiator elements 3, 5, 7, 9, 11 and 13 (and intervening radiator elements) of the frequency scan antenna array 40.

An array as described above is constructed in six steps, the first three of which are as follows: (1) generate a termination patch having an input impedance Zo and at the design frequency using full wave numerical simulation; (2) generate a quarter-wave input matching transformer of input impedance Zo/2 and output impedance Zo at the design frequency using full wave simulation; and (3) build a small database of impedance matched and correctly phased radiator elements at the design frequency using full wave simulation (in this regard, the structural template shown in FIG. 2A is applicable).

The entries in the small database are as follows:

W(radiator) L (radiator) L(match) W(match) L(phase) P(radiated) where W(radiator) is the width of main radiator section 22 (FIG. 2A) perpendicular to the direction of RF signal propagation; L(radiator) is the length of main radiation section 22 along the direction of RF signal propagation; W(match) is the width of impedance matching section 21; L(match) is the length of impedance matching section 21; L(phase) is the length of transmission line section 23; and P(radiated) is the power radiated, as determined by full wave simulation. The database is built by optimizing radiator elements of different W(radiator) values for minimum S11 reflection S-parameter.

The method of designing the array continues with the following three steps: (4) generating a set of power weights for each element using conventional theory (for example, FIG. 3); (5) finding entries in the database both above and below the sought power weight; and (6) from the selected entries, interpolating a specific radiator design for use in the overall array design and fabrication.

Figure 5:
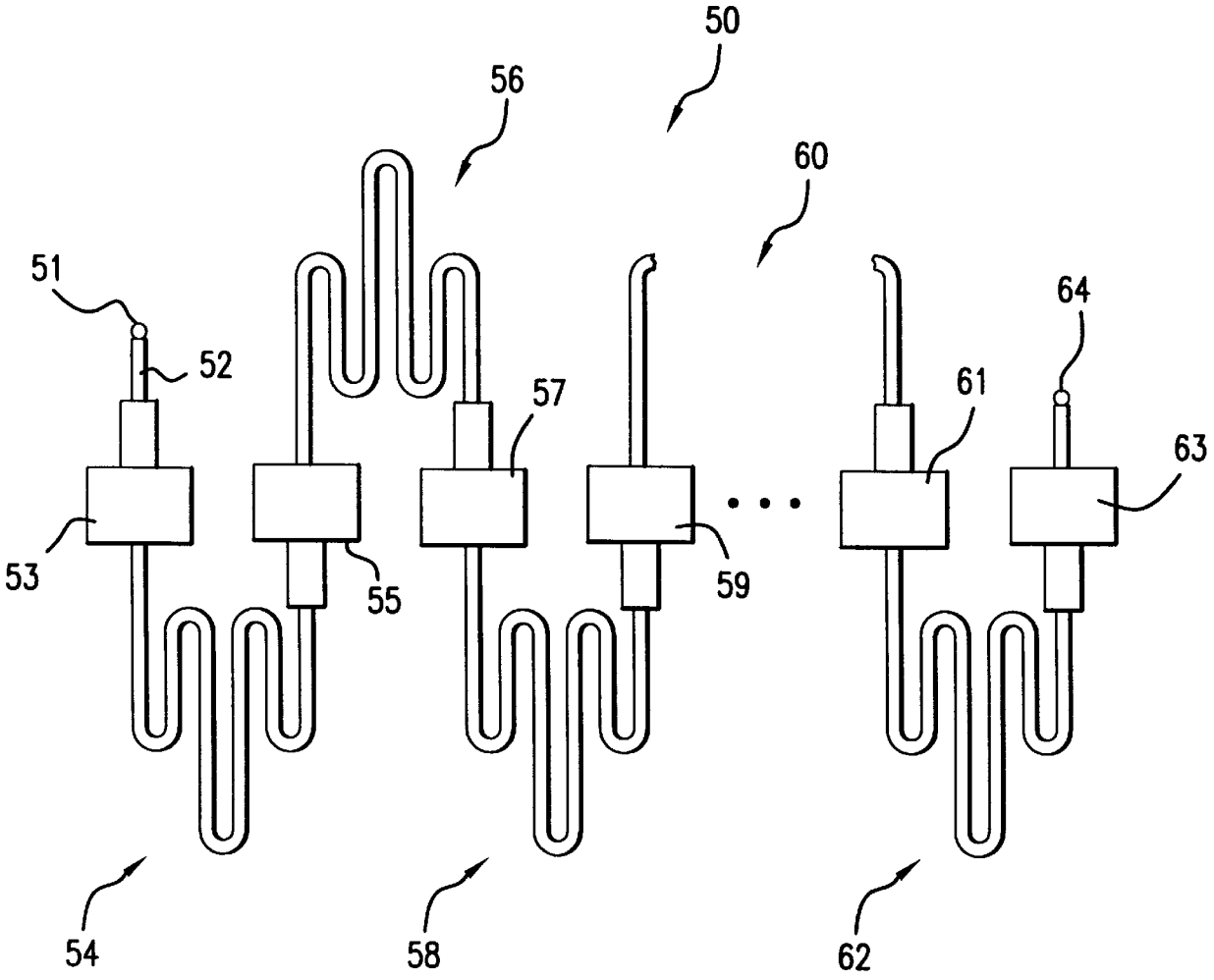
FIG. 5 is a diagrammatic representation of an alternative embodiment of the present invention, in which the delay line between neighboring elements is meandering.

FIG. 5 is a diagrammatic representation of an alternative embodiment of the present invention, in which the delay line between neighboring radiator elements is meandering. As seen therein, the alternate embodiment of the frequency-scan traveling wave antenna comprises elements generally corresponding to the elements shown in the first embodiment of FIG. 1. Thus, the elements are as follows: input port 51; quarter wave transformer 52; radiator element 53; meandering delay line 54; radiator element 55; meandering delay line 56; radiator element 57; meandering delay line 58; radiator element 59; various intervening delay lines and radiator elements eliminated for simplicity, but generally indicated by reference numeral 60; penultimate radiator element 61; final delay line 62; final radiator element 63; and output port 64. Operation of the embodiment of FIG. 5 is generally the same as the operation of the embodiment of FIG. 1 described above, and thus further detail will not be provided.

Various modifications to the invention disclosed therein can be implemented. For example, the electrical phase between the center of neighboring radiator elements is, preferably, one of the series (N+1/2) wavelengths. Thus the delay lines can be altered in length to accommodate this factor, while still preserving both array symmetry and coherent formation of a radiating beam.

A one-dimensional frequency array as shown may be used as a component in a two-dimensional array to achieve two-dimensional beam shaping and scanning control. It should be noted that the scanning will still be in one axis.

The delay line between neighboring elements may be meandered, as shown in the embodiment of FIG. 5, in order to achieve better packing density. This is especially advantageous when the integer value of the parameter N is large.

The number of elements in the one-dimensional array can be selected as required to achieve a required degree of beam width narrowing.

The spacing between the center of radiator elements, indicated in FIG. 1 above by the parameter "D", is chosen for close packing of radiator elements. However, it may be as large as 1.5 wavelengths at the center design frequency. Although it is preferred that neighboring radiators be spaced at a uniform spacing of D, small deviations from this uniformity criterion (up to 20% variation) is possible without serious degradation of antenna performance.

Finally, the design of the present invention has been developed and tested at 39 GHz. Nevertheless, the design process is such that the present invention can be implemented by arrangements representing a scaling up to 100 GHz. and a scaling down to 10 GHz, or even lower, if the system can support the required larger dimensions.

As described above, the present invention employs an impedance matching section 21 (FIG. 2A) at the input of each main radiator section 22 to compensate for radiated power in the radiator elements 3, 5, 7, 9, 11 and 13 (and any intervening radiator elements), and to allow the input impedance of each radiator element to be the same as its output impedance. Conventional traveling wave radiators have not used impedance matching to correct for impedance shifts arising from radiated energy. The specific use of impedance matching at the input of each radiator element in the traveling wave frequency scan antenna reduces reflections and provides better control over the array design, and is a unique and novel feature of the present invention.

In the invention, the arrangement of radiator elements and delay lines is geometrically symmetric, thereby balancing stray radiation, and minimizing the amount of degradation of beam pattern and side lobe levels due to radiation from the delay lines between the radiator elements.

Finally, the traveling wave antenna of the present invention uses impedance matched radiator elements and a symmetric layout, and this enables one to obtain an accurate degree of control over power weighting at each radiator element, resulting in improved side lobe levels and narrow beam at millimeter wave frequencies.

While preferred forms and arrangements have been shown in illustrating the invention, it is to be understood that various changes and modifications may be made without departing from the spirit and scope of this disclosure.

What is claimed is:

1. A frequency-scan traveling wave antenna, comprising a plurality of paired radiator elements, each pair of radiator elements being connected by a respective delay line;

each of said radiator elements comprising an input port, a main radiator, and impedance matching means connected between said input port and said main radiator for compensating for radiated power in said radiator elements, and for matching an input impedance of said radiator elements to an output impedance of said radiator elements.

2. The frequency-scan traveling wave antenna of claim 1, further comprising a quarter-wave transformer connected to said input port of a first one of said radiator elements.

3. The frequency-scan traveling wave antenna of claim 1, wherein each of said radiator elements includes an output port and a section of transmission line connected between said main radiator and said output port, said section of transmission line being impedance matched to said output port.

4. The frequency-scan traveling wave antenna of claim 3, wherein said section of transmission line sets an electrical length of said radiator elements to one full wavelength.

5. The frequency-scan traveling wave antenna of claim 1, wherein said plurality of radiator elements and said delay line disposed between respective pairs of said radiator elements form a geometrically symmetric arrangement, thereby balancing stray radiation and minimizing an amount of degradation of a beam pattern and side lobe levels due to radiation from said delay line between said radiator elements.

6. The frequency-scan traveling wave antenna of claim 1, wherein each of said delay line comprises an input port, an output port, and a plurality of transmission line sections extending between said input port and said output port, said plurality of transmission line sections having uniform impedance.

7. The frequency-scan traveling wave antenna of claim 6, wherein each of said transmission line of each of said delay line is connected to an adjacent transmission line section by a mitered corner so as to maintain uniform impedance along each of said delay line.

8. The frequency-scan traveling wave antenna of claim 1, wherein each of said delay line has the same electrical length.

9. The frequency-scan traveling wave antenna of claim 8, wherein each of said delay line has an electrical length equal to one of the series (3/2, 5/2, 7/2, ...) wavelengths at a center frequency of operation.

10. The frequency-scan traveling wave antenna of claim 1, wherein an electrical phase between the center of each respective pair of radiator elements is one of the series (N+1/2) wavelengths for positive integer N.

11. The frequency-scan traveling wave antenna of claim 1, wherein each of said delay line is meandered to achieve better packing density.

12. The frequency-scan traveling wave antenna of claim 1, wherein a spacing between the center of adjacent radiators is no greater than 1.5 wavelengths at a center design frequency.

* * * * *